April 7, 1953      E. K. RALSTON      2,634,123

MOVEMENT MULTIPLIER FOR DISK SPRINGS

Filed Nov. 15, 1949      2 SHEETS—SHEET 1

ELDON KIPP RALSTON
INVENTOR.

BY
Hyde, Meyer, Baldwin & Doran
HIS ATTORNEYS

April 7, 1953      E. K. RALSTON      2,634,123

MOVEMENT MULTIPLIER FOR DISK SPRINGS

Filed Nov. 15, 1949      2 SHEETS—SHEET 2

ELDON KIPP RALSTON
INVENTOR.

BY
Hyde, Meyer, Baldwin & Doran
HIS ATTORNEYS

Patented Apr. 7, 1953

2,634,123

UNITED STATES PATENT OFFICE 2,634,123

MOVEMENT MULTIPLIER FOR DISK SPRINGS

Eldon Kipp Ralston, Cleveland Heights, Ohio

Application November 15, 1949, Serial No. 127,490

1 Claim. (Cl. 267—1)

This invention relates to improvements in movement multipliers for disk springs.

In my copending application Serial No. 715,195, filed December 10, 1946, I have explained fully the use of dished or conical washers of the Belleville spring type for use in valve mechanisms or the like. Sometimes, due to the size and load limitations, the operating range of the spring washer is not as great as could be desired and thus the lift of the valve or other movable member is not as great as necessary. Several spring washers have been used in series to accomplish this but this is not alway practical from a manufacturing standpoint. It is an object of the present invention to provide greater movement of the parts operated when using a single spring washer of this type.

Several modifications of the invention will be shown, some in which the multiplying fingers extend radially inwardly from the disk washer, some in which the multiplying fingers extend radially outwardly therefrom, and some in which the multiplying fingers extend in both directions, namely, radially inwardly and outwardly from the spring washer.

In the drawings, Fig. 1 is a central vertical sectional view through a control valve utilizing my invention;

Fig. 5 is a fragmental sectional view enlarged, taken along the line 5—5 of Fig. 4; while

My present invention is related to disk spring washers of the Belleville type where the desired deflection of the spring is impossible or impractical to obtain by the use of a single solid spring. The present invention provide means for multiplying the deflection of such a solid spring.

Figure 1:
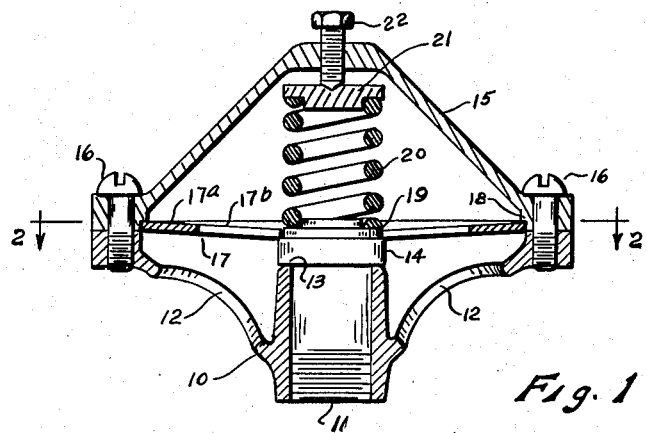

While my invention has many uses, I have chosen to show the same in Fig. 1 as applied to a typical relief valve having a body 10 which is provided with a fluid inlet 11 and fluid outlet openings 12. A valve seat 13 coacts with a valve disk 14 to control fluid flow between the inlet 11 and the outlets 12. A valve cover 15 is secured to the main valve body by means of screws 16.

The principal, and sometimes the only spring loading for the valve disk 14 is provided by the conical washer generally indicated at 17 and comprising a solid imperforate ring 17a from which rigidly extend fingers 17b. The outer perimeter of the washer is held beneath an abutment 18 on the cover 15, while the inner perimeter of the washer engages a shoulder 19 on the valve disk 14. Thus, any deflection of the solid disk 17a is transmitted to the valve disk 14 through the fingers 17b which thus multiply the deflection of the solid spring washer 17a.

Additional loading and adjusting means may be supplied through a helical spring 20 which is engaged between the valve disk 14 and a collar 21 which is engaged by an adjusting screw 22 threaded through the valve cover 15. This use of an additional helical spring for adjusting purposes is fully described in my above mentioned copending application.

Figure 2:
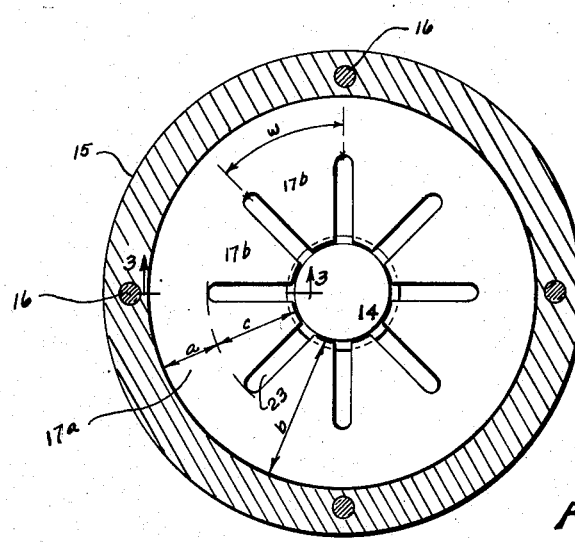
Fig. 2 is a transverse sectional view of the same taken along the line 2—2 of Fig. 1.
Figure 3:
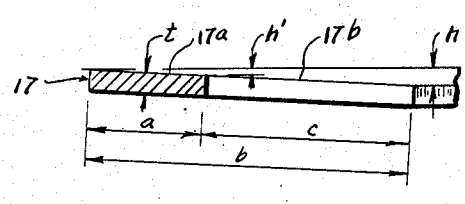
Fig. 3 is a fragmental sectional view somewhat diagrammatic taken along the line 3—3 of Fig. 2 and enlarged therefrom.

In Figs. 2 and 3, I have indicated at $a$ the radial width of the imperforate ring which acts like a disk spring. I have indicated by $t$ the effective average thickness of the disk washer. I have indicated at $c$ the length of the fingers 17b radially inwardly from the imperforate ring 17a. In the present instance, but by no means as a limitation, the fingers 17b are provided by cutting radial slots 23 radially through the annular washer 17 for a portion of the radial width thereof.

Upon a predetermined deflection of the imperforate ring 17a as a disk spring, the deflection would be as indicated at $h'$ in Fig. 3 if the imperforate ring formed the entire disk spring. By utilizing the multiplying fingers 17b which move rigidly with the ring 17a, the movement $h'$ is multiplied to that indicated at $h$ in Fig. 3 where $h$ is proportionately greater than $h'$ to the same degree as $b$ is greater than $a$. Thus by $b$, I indicate the effective washer lever arm in this type of spring washer.

I have also indicated in Fig. 2 the arcuate width $w$ where the fingers 17b join the imperforate ring 17a.

I find I obtain the best results from spring washers constructed according to my invention when the parts are so constructed and arranged that $$h = \frac{K \times b \times t}{2 \times a}$$

In this formula, K varies from 1 to 5. I also prefer to make the arcuate width $w$ less than four times $a$.

Figure 4:
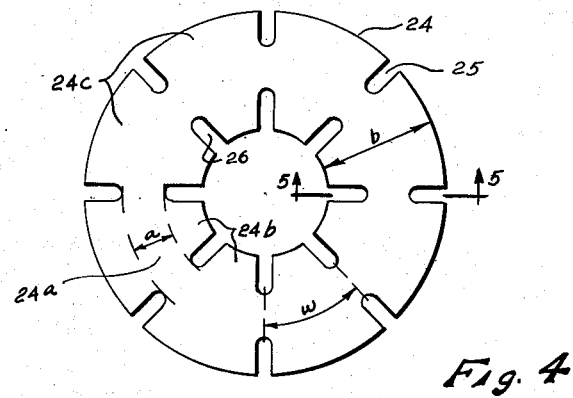
Fig. 4 is a top plan view of a washer similar to that shown in Figs. 1 and 2 of the first modification.
Figure 5:
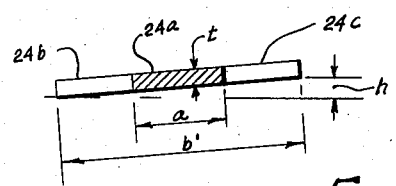

In the modifications shown in Figs. 4 and 5, I have shown a disk washer 24 adapted to be used in the same position as the disk washer 17 of the first described form. Here the solid portion 24a of the disk is indicated as having a radial width $a$ analogous to the same dimension as indicated in Figs. 2 and 3. This is the dimension which determines the disk washer action of the entire device. Extending radially inwardly from the imperforate ring 24a are tongues 24b. And extending radially outwardly from the imperforate ring are tongues 24c. In this case, slots 25 extend radially outwardly from the inner perimeter of the washer and slots 26 extend radially inwardly from the outer perimeter of the washer. The dimensions $a$, $t$ and $h$ are indicated in Fig. 5 for the modification of Fig. 4. Here the movement or deflection of the solid portion of the washer is multiplied inwardly by the fingers 24b and outwardly by the fingers 24c so that the total deflection $h$ is equal to the entire effective lever arm as indicated at $b'$ in Fig. 5.

Figure 6:
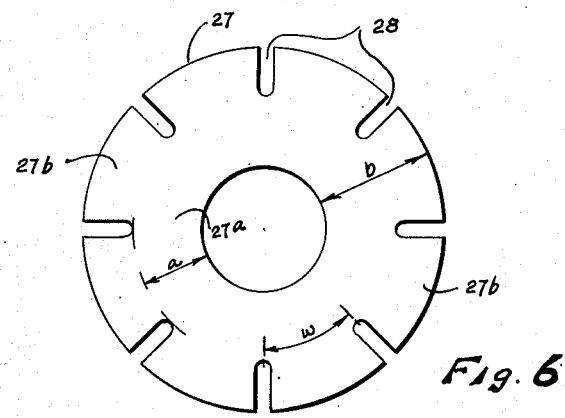
Fig. 6 is a top plan view of another modified form of spring washer adapted for use in my invention.

In the modification of Fig. 6, I have shown a washer 27 which may be used in place of the spring washers 17 and 24 of the previously described forms. Here the solid imperforate ring giving the spring washer action is indicated at 27a with fingers 27b extending radially outwardly therefrom only. The radial width of the imperforate ring is again indicated by the dimension $a$. The slots 28 cut radially inwardly from the outer perimeter of the washer, divide the same into the fingers 27b, leaving the imperforate ring 27a at the radially innermost part of the washer. The arcuate width of the fingers where they join the imperforate ring is indicated at $w$. The effective washer lever arm is indicated by the dimensions $b$ on Fig. 6.

In the claims I have defined fingers rigidly connected with the spring washer and extending radially therefrom "in at least one direction." By this language, I mean that they either extend radially inwardly from the imperforate ring as shown in Figs. 1 and 2 or radially outwardly therefrom as shown in Fig. 6, or, of course, they may extend both inwardly and outwardly as shown in Figs. 4 and 5.

My invention may also be used where the pressure is applied beneath the spring washer, but, since this would be accompanied by leakage through the slots 23, 25, 26 and 28 of the present application, I have chosen to describe this particular form of the present invention in my copending application Serial No. 127,489 filed November 15, 1949, where I show diaphragms of this type coated with a rubber covering or the like or as a support behind a flexible diaphragm whereby the benefits of both the present invention and the invention of the copending application may both be realized.

While I have described my invention as applied to a disk spring or washer of the frustoconical type, it will be understood that it might also be applied to a substantially flat annular washer where the same had sufficient flexibility to provide the desired movement of the valve disk or other movable member. In such case, the flexible fingers might extend radially inwardly, radially outwardly or in both directions being formed rigid with the annular flat washer after the teachings of the present application. This would add flexibility to the composite washer or disk spring as will be readily understood. Also, in accordance with the teachings of the present application, the movement would be multiplied by the fingers extending radially away from the solid annular disk or washer. In other words, if the device of Fig. 1 were applied to a flat washer, the movement of the valve disk under pressure would be multiplied through the lever arm of the radial fingers so as to more readily flex the solid portion of the disk washer.

It will be noted in Fig. 1, that the sole engagement between the washer 17 and the relatively movable parts, is between the inner and outer perimeters of the washer and the relatively movable parts, in the present case, the engagement of the outer perimeter of the washer with the valve body and the engagement of the inner perimeter of the washer with the valve member 14. This leaves the washer free to provide the spring action herein described.

It will be noted that in every form of my device I have shown more than three fingers and the spaces between these fingers is always open even when the washer is stressed. The purpose of this is to leave the fingers always free to provide the motion multiplying movement herein described.

It will be noted in all forms of my invention that the dimension $c$ is always more than forty percent of dimension $b$. In other words, the length of the fingers is more than forty percent of the total radial dimension of the washer. This percentage of $c$ divided by $b$ is respectively in Fig. 2, 59, in Fig. 4, 64 and in Fig. 6, 41.

What I claim is:

As an actuator between two relatively movable parts wherein a Belleville spring washer annular in plan and having inner and outer perimeters has its sole engagement between said perimeters respectively and said parts, the combination therein of said washer having an imperforate ring of radial width $a$ and effective average thickness $t$ and with fingers rigidly connected with said ring and extending in at least one direction radially therefrom, said fingers of effective length $c$ beyond said ring whereby $a$ plus $c$ equals effective washer lever arm $b$, $c$ being more than forty percent of $b$, and the cone height of said washer in free unstressed condition being substantially $h$, the number of said fingers being greater than three, there being a space between said fingers at all times in stressed condition of said washer, and wherein twice the value of $h$ multiplied by $a$ and divided by the product of $b$ multiplied by $t$ equals a number between one and five.

ELDON KIPP RALSTON.

REFERENCES CITED

The following references are of record in the file of this patent:

UNITED STATES PATENTS

| Number | Name | Date |
| --- | --- | --- |
| 1,939,286 | Spencer | Dec. 12, 1933 |
| 1,988,345 | Vaughn | Jan. 15, 1935 |
| 2,169,787 | Becker | Aug. 15, 1939 |
| 2,325,193 | Nutt et al. | July 27, 1943 |
| 2,332,630 | Fawkes | Oct. 26, 1943 |
| 2,429,069 | Murray | Oct. 14, 1947 |